United States Patent [19]
Suzuki

[11] Patent Number: 5,833,491
[45] Date of Patent: Nov. 10, 1998

[54] ELECTRONIC EQUIPMENT HAVING A MINIATURIZED CELL CONTAINER HAVING A SECURELY LOCKED COVER WITH SWITCH

[75] Inventor: Hiroyuki Suzuki, Tokyo, Japan

[73] Assignee: Sony Corporation, Tokyo, Japan

[21] Appl. No.: 750,153

[22] PCT Filed: Apr. 22, 1996

[86] PCT No.: PCT/JP96/01091

§ 371 Date: Mar. 3, 1997

§ 102(e) Date: Mar. 3, 1997

[87] PCT Pub. No.: WO96/33517

PCT Pub. Date: Oct. 24, 1996

[30]     Foreign Application Priority Data

Apr. 21, 1995  [JP]  Japan .................................... 7-120842
Apr. 21, 1995  [JP]  Japan .................................... 7-120843

[51] Int. Cl.[6] ...................................................... H01M 2/10
[52] U.S. Cl. .............................................. 439/500; 429/97
[58] Field of Search ............................... 439/500; 429/97

[56]              References Cited

U.S. PATENT DOCUMENTS 3,881,961   5/1975  Nation ....................................... 429/97
5,248,569   9/1993  Pine et al. .................................. 429/97

FOREIGN PATENT DOCUMENTS 52-23323    2/1977   Japan .
55-118476   8/1980   Japan .
58-134860   9/1983   Japan .
64-44562    3/1989   Japan .
6-26151     4/1994   Japan .

*Primary Examiner*—Neil Abrams
*Attorney, Agent, or Firm*—Jay H. Maioli

[57]                ABSTRACT

An electronic equipment having a miniaturized cell container with a securely locked cell door includes a casing having an opening for receiving a cylindrical battery cell, a supporting member mounted within the casing and to a terminal plate rotatably mounted to the supporting member. The terminal plate includes a terminal portion for engaging a contact on the battery and a lug for engaging a contact piece joined to circuitry within the casing. A cover slidably mounted on the terminal plate and being movable to a closed position where a latching part engages a mating latching portion on the casing to return the cover in the closed position with the terminal portion engaging the battery terminal and joined to circuitry in the casing.

9 Claims, 15 Drawing Sheets

ELECTRONIC EQUIPMENT HAVING A MINIATURIZED CELL CONTAINER HAVING A SECURELY LOCKED COVER WITH SWITCH

SPECIFICATION

1. Technical Field

This invention relates to an electronic equipment, such as a tape recorder, a disc player or a radio receiver. More particularly, it relates to an electronic equipment having a cell container for containing a cell.

2. Background Art

In electronic equipments, such as tape-recorders, disc players or radio receivers, some are constructed for being fed with current from an external equipment, or exchanging information signals with the external equipments.

In these sorts of the electronic equipments, plug jacks are provided on an outer casing of the main body of the equipment, and a plug provided on one end of a connection cord drawn out of the external equipment is connected to this plug jack for establishing electrical connection with the external equipment.

On the other hand, some of the electronic equipments, such as tape-recorders, disc players or radio receivers, are designed so as to be portable.

With the portable electronic equipments, cells are used for a power source. Therefore, these electronic equipments are designed to fit the shape of the cell contained therein. The cell container designed to house a cylindrically-shaped cell has a cylindrically-shaped space for housing the cell. The cell container having such housing space occasionally has an opening in one end face of the cylindrically-shaped housing space for insertion and detachment of the cell via this opening. The cylindrically-shaped cell is inserted and removed with respect to such cell container with the longitudinal direction as the inserting/detachment direction.

The cell container has an opening/closure member for opening/closing the opening for preventing detachment of the cell housed therein. The opening/closure member has a terminal plate for establishing electrical connection between the cell housed within the cell container and an electronic circuit contained in the main portion of the electronic equipment. The opening/closure member is rotatably mounted via a pivot on the main portion of the equipment.

Meanwhile, the opening/closure member opening or closing the opening is sized to sufficiently cover the entire surface of the opening for positively holding the cell housed within the cell container and for preventing intrusion of dust and dirt into the main portion of the apparatus via the opening. In addition, the opening needs to be closed reliably.

On the inner lateral surface of the opening/closure member is mounted a terminal plate. This terminal plate is formed by a thin metal sheet and hence is deformed easily. If the terminal plate is deformed, it is contacted with an electrode of the cell different from the electrode with which the terminal plate is to be contacted thus shorting the cell. Thus the opening/closure member is sized to cover the terminal plate in its entirety for preventing an unneeded force from being applied to the terminal plate provided on the inner lateral surface thereof.

In addition, the pivot supporting the opening/closure member is provided outside of the opening. The reason is that, if the pivot is mounted facing the opening, the cell cannot be inserted or detached and if the pivot is mounted facing the outside of the main portion of the equipment, the equipment is impaired in appearance.

Thus the opening/closure member is sized to cover the entire surface of the opening and to cover the pivot mounted outside the opening.

If the opening/closure member is increased in size in this manner, the main portion of the equipment is also increased in size, making it impossible to reduce the overall size of the apparatus in its entirety.

DISCLOSURE OF THE INVENTION

An object of the present invention to reduce the size of the electronic equipment having a cell container.

Another object of the present invention is to provide an electronic equipment capable of reliably closing the cell container for preventing detachment of the cell contained therein.

Still another object of the present invention is to provide an electronic equipment in which the power source of the cell housed within the cell container can be reliably supplied to an electronic circuit in the main portion of the apparatus.

Yet another object of the present invention is to provide an electronic equipment capable of sufficiently maintaining the reliability of the opening/closure member when opening or closing the opening in the cell container.

An electronic equipment of the present invention, proposed for accomplishing the above object, has a cell container having an opening and adapted for containing a cell inserted via the opening, and an opening/closure member for opening/closing the cell container. A terminal plate is provided on the opening/closure member and adapted for being contacted with a terminal of the cell when the opening is closed by the opening/closure member. The electronic equipment also has holding means for holding the opening/closure member at a position of closing the opening, and a connecting portion provided on the cell container and adapted for being engaged with the terminal plate when the opening/closure member is at a position of closing the opening.

The terminal plate has its one end rotatably supported by the cell container and has a mounting portion and a terminal portion mounted on its other portion. The mounting portion mounts the opening/closure member and the terminal portion contacts with a terminal of the cell housed within the cell container. Thus the opening/closure member is rotatably supported via the terminal plate in the cell container.

An electronic equipment according to the present invention also includes a cell container for housing a cylindrically-shaped cell inserted from an opening of a main portion of the equipment, an opening/closure member for opening/closing the opening, a second terminal portion moved along with the opening/closure member and adapted for being connected to the other terminal of the cylindrically-shaped cell contained in the cell container as the opening is closed by the opening/closure member, and connection means disengaged from the second terminal portion when the opening/closure member is at the position of opening the opening. The cell container has a first terminal portion connected to one of the terminals of the cylindrically-shaped cell. The connection means is electrically connected with the second terminal portion when the opening/closure member is at a position of closing the opening.

The second terminal portion has a protrusion and a mounting portion for mounting the opening/closure member. The protrusion is electrically connected to the connection means when the opening/closure member is in a state of closing the opening.

The opening/closure member is moved relative to the second terminal portion. There is provided holding means which is moved relative to the second terminal portion when the opening/closure member is at the position of closing the opening for maintaining the opening/closure member in a state of closing the opening.

The holding means has an engagement portion on one of the main portion of the equipment and the opening/closure member and a mating engagement portion on the other of the main body portion of the equipment and the opening/closure member. The opening/closure member is moved relative to the terminal plate in a direction in which the engagement portion is engaged with the mating engagement portion when the opening/closure member is moved to a position of closing the opening. The engagement portion and the mating engagement portion are engaged with each other for maintaining the opening/closure member at a position of closing the opening.

The opening/closure member is rotatably mounted so as to have a center of rotation in a space portion defined in the vicinity of the opening of the cell container between the opening/closure member closing the opening and the cell housed in the cell container.

Other objects and advantages of the present invention will become apparent from the following description of preferred embodiments in conjunction with the accompanying drawings.

BEST MODE FOR CARRYING OUT THE INVENTION

Figure 1:
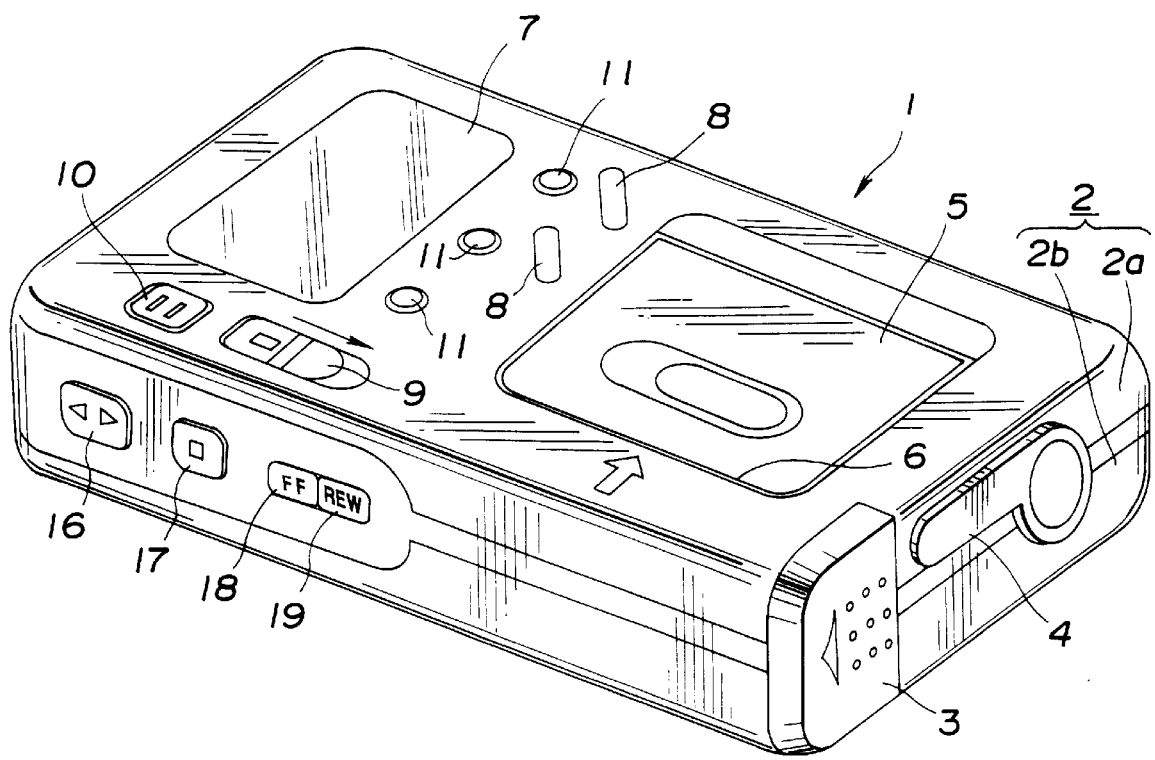
FIG. 1 is a perspective view showing a tape recorder as an electronic equipment to which the present invention is applied.

Referring to the drawings, preferred embodiment of the present invention will be explained in detail.

The following embodiments are directed to a digital tape recorder for converting information signals, such as acoustic signals, into digital signals for recording and/or reproduction.

The tape recorder 1, to which the present invention is applied, is sized so as to be portable, and has a casing 2 constituting a main portion of the apparatus, as shown in FIGS. 1 to 7. This casing 2 is made up of an upper half 2a and a lower half 2b abutted and connected to each other. Within the casing 2 is mounted a cassette loading unit 6 for holding a tape cassette, not shown, as a recording medium for information signals for the tape recorder 1, for loading the tape cassette in the cassette loading unit 6. The cassette loading unit 6 has a cassette holder 5 for holding a tape cassette, not shown, for loading the tape cassette at a cassette loading position in the cassette loading unit 6. This cassette holder 5 is supported by the casing 2 for rotation between a position of loading the tape cassette in the cassette loading unit 6 and an ejection position for insertion/detachment of the tape cassette.

Figure 2:
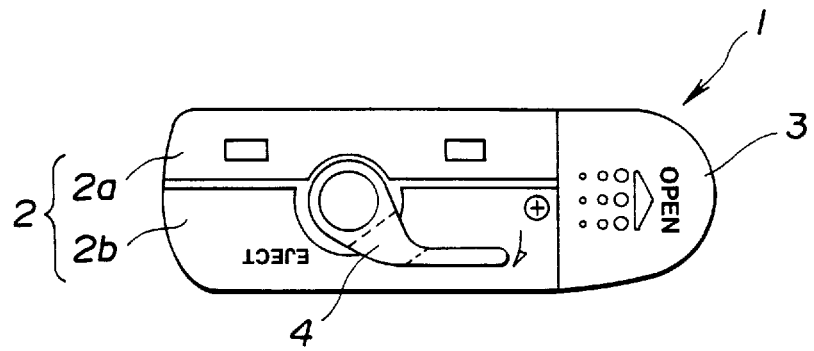
FIG. 2 is a right-hand side view of the tape recorder.

When the cassette holder 5 has been rotated to the position of loading the tape cassette on the cassette loading unit 6, the cassette holder 5 closes the opening in the upper surface of the cassette loading unit 6, as shown in FIG. 1. The tape cassette loaded on the cassette loading unit 6 can be ejected by rotating an ejection lever 4 provided on one lateral surface of the casing 2, as shown in FIGS. 1 and 2. That is, if the ejection lever 4 has been rotated, the cassette holder 5 is rotated to the ejection position in which the cassette holder 5 is protruded out of the casing 2, thus enabling ejection of the tape cassette held by the cassette holder 5.

Within the casing 2 is mounted a tape driving unit for running a magnetic tape housed within the tape cassette loaded on the cassette mounting unit 6 and for recording and/or reproducing information signals for the magnetic tape. Thus tape driving unit is made up of a rotary magnetic head unit having a tape guide drum around which the magnetic tape is placed obliquely over a pre-set angular extent, and a reel driving shaft for rotating a tape reel having a magnetic tape placed thereon for running the magnetic tape. Within the casing is arranged an electronic circuit for controlling the operation of the tape driving unit and for controlling the recording/reproduction of information signals.

Figure 3:
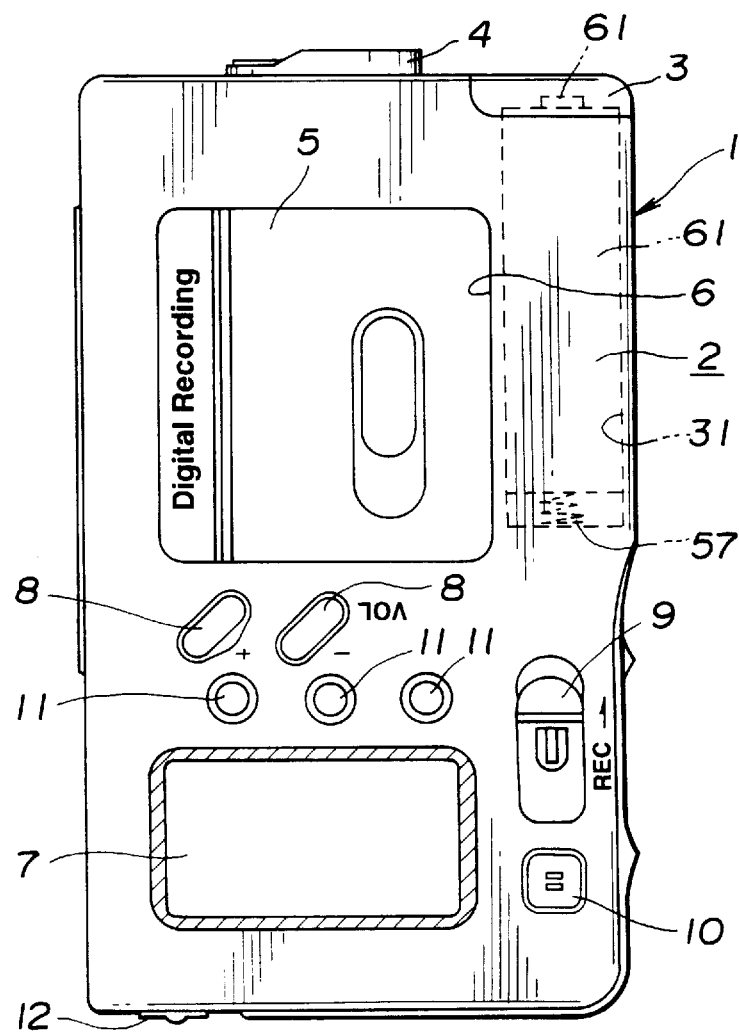
FIG. 3 is a plan view of the tape recorder.

On the upper surface of the casing 2 carrying the cassette loading unit 6 is mounted a display unit 7 for displaying the operating mode of the tape driving unit and for displaying addresses or the like of information signals recorded and/or reproduced on or from the magnetic tape, as shown in FIGS. 1 and 3. The display unit 7 is constructed using a display element such as a liquid crystal device (LCD).

Figure 5:
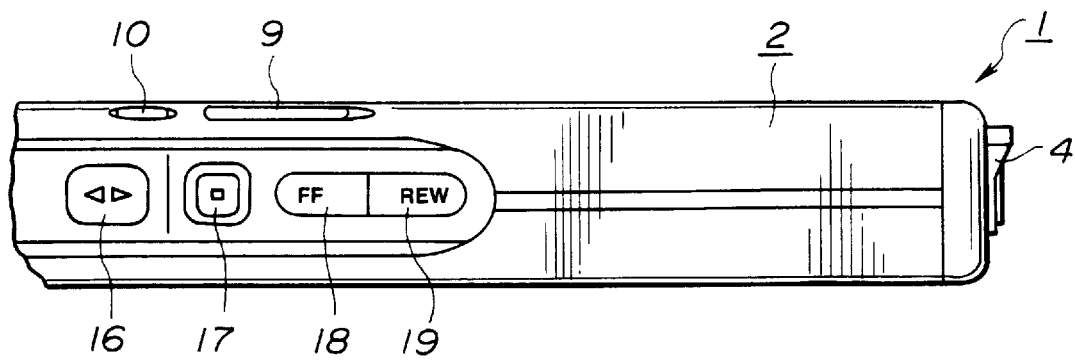
FIG. 5 is a plan view of the tape recorder.

On the upper surface of the casing 2 are mounted pushbuttons 8, 10, 11 and a slide switch 9, as shown in FIGS. 1 and 3. On the front side of the casing 2 are also mounted plural pushbutton switches 16 to 19, as shown in FIGS. 1 and 5. The pushbutton switches 8, 8 provided on the upper surface of the casing 2 are volume switches for adjusting the playback output level of the acoustic signals reproduced by the tape recorder 1. The remaining one 10 of the pushbutton switches mounted on the upper surface of the casing 2 is a pause switch for transiently halting the running of the magnetic tape. The further remaining pushbutton switches 11 are switches for selecting the display contents of the display unit 7. The slide switch 9 arranged on the upper surface of the casing 2 is a recording mode selecting switch for selecting the recording mode.

The pushbutton switch 16 arranged on the front side of the casing 2 is a playback mode selection switch for selecting the playback mode. The pushbutton switch 17 arranged on the front side of the casing 2 is a halt switch for stopping the operation of the tape driving unit. The pushbutton switch 18 arranged on the front side of the casing 2 is a fast feed selection switch for selecting the fast feed mode for running the magnetic tape at an elevated speed. The pushbutton switch 19 arranged on the front side of the casing 2 is a rewind mode selection switch for selecting the winding mode for rewinding the magnetic tape.

Figure 4:
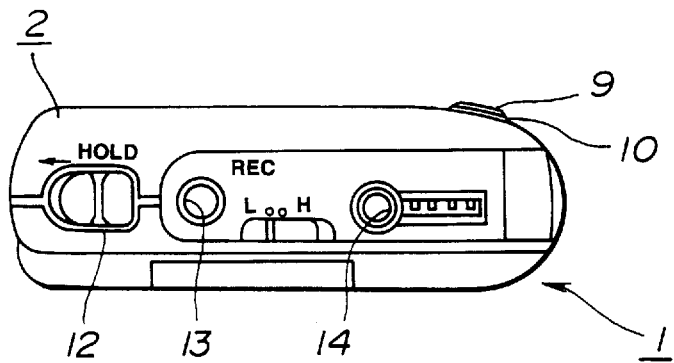
FIG. 4 is a left-hand side view of the tape recorder.

On the other opposite lateral surface of the casing 2 are mounted a plug jack 13 for microphone connection to which is connected a microphone unit for collecting external sound for recording on a magnetic tape, and a plug jack 14 for headphone connection to which is connected a headphone device for converting the acoustic signals reproduced by the tape recorder 1 into sound, as shown in FIG. 4. On the opposite lateral surface of the casing 2 is mounted an operating mode holding switch 12 for holding the operating mode which has selected the present tape recorder.

Figure 7:
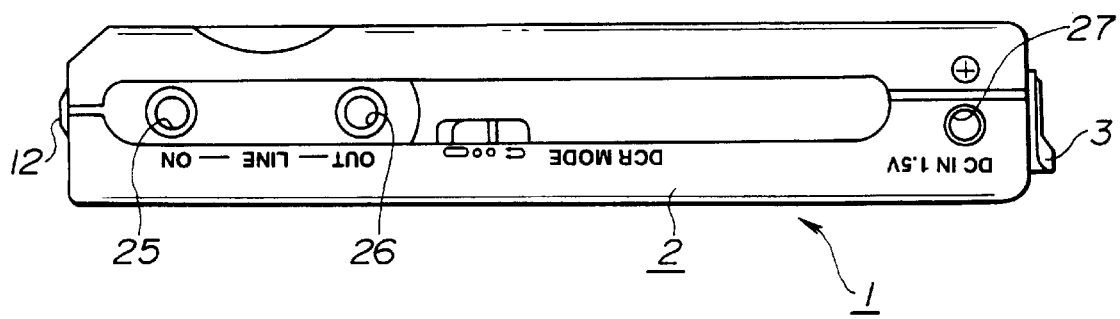
FIG. 7 is a back-side view of the tape recorder.

On the back surface of the casing 2 is connected a plug jack 25 connected to a plug provided on a connection cord for entering the information signals from the external equipment, such as a disc player, to this tape recorder 1, and a plug jack 26 for outputting information signals connected to a plug provided on a connection cord for outputting the information signals, such as acoustic signals reproduced by the tape recorder 1, as shown in FIG. 7. On the back surface of the casing 2 is mounted a plug jack 27 for supplying the power source connected to a connection plug for power source supply for supplying the driving power source of the tape recorder 1. That is, the external power source may be supplied to the tape recorder 1 via the plug jack 27 for supplying the power source.

Figure 6:
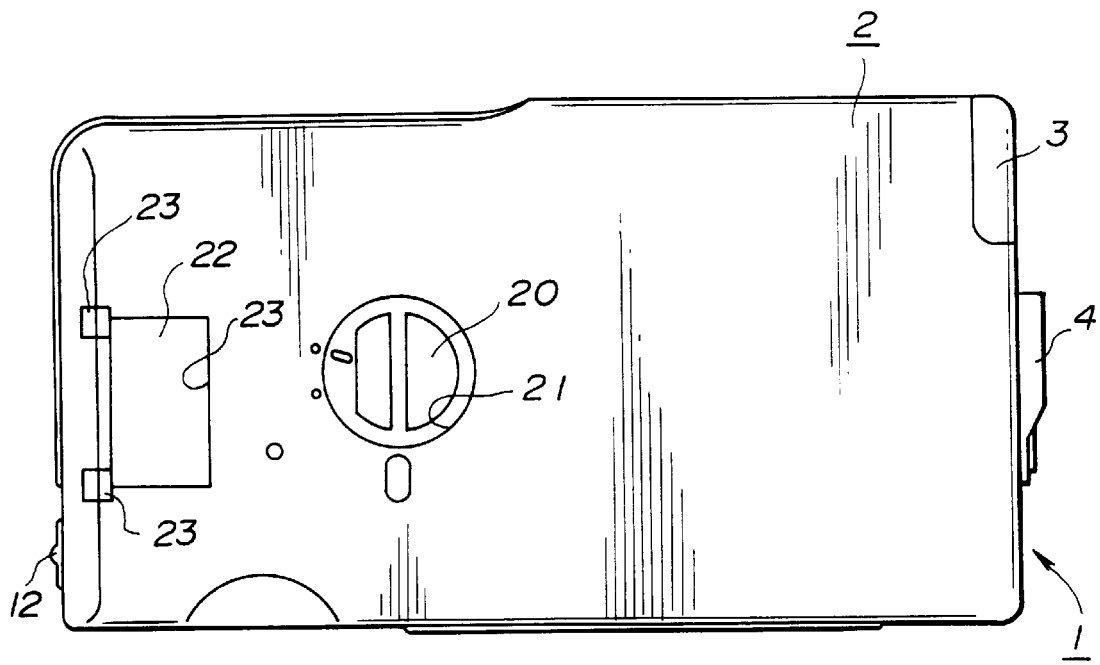
FIG. 6 is a bottom view of the tape recorder.

On the bottom surface of the casing 2 is mounted a connecting portion 24 having a connection terminal for connecting the tape recorder to other equipments, such as a disc player or a speaker unit. When out of use, the connecting portion 24 is closed by an opening/closing lid 22, as shown in FIG. 6. The opening/closing lid 22 is mounted on the casing 2 for closing the connecting portion 24 by having a retention pawl 23 retained by a portion of the casing 2.

The casing 2 is provided with a cell container 31 for housing a cell 60 operating as a power source for driving the preset tape recorder. The cell container 31 is sized so as to be large enough to accommodate a "tan-3" sized cylindrically-shaped cell 60, and is formed for extending along the front side in register with the cassette mounting portion 6 within the casing 2.

Figure 8:
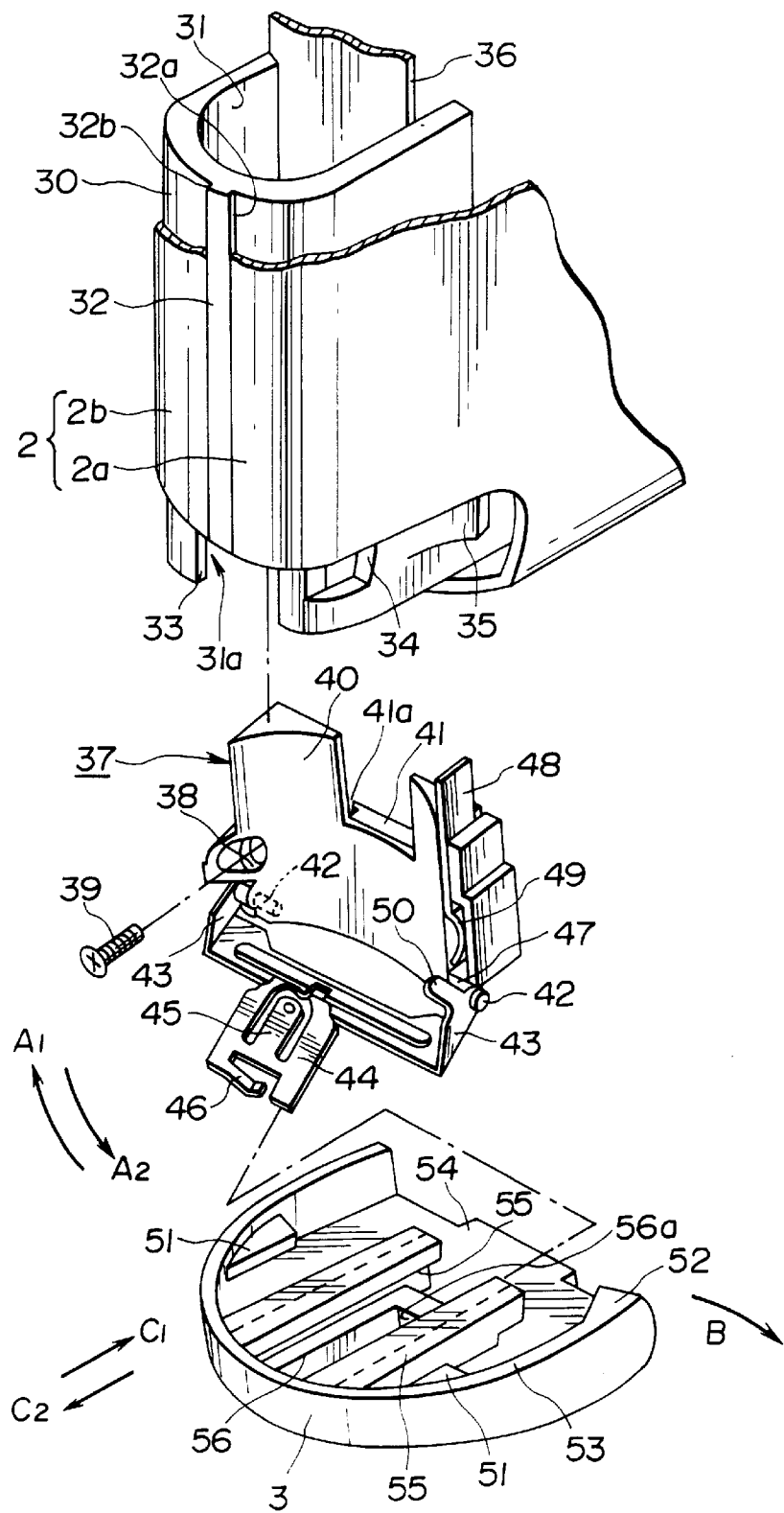
FIG. 8 is an exploded perspective view showing a cell container formed in the tape recorder.

The cell container 31 is formed by a substantially semi-cylindrically shaped cell holder 30 arranged for extending along the front side of the casing 2 and a portion of a frame 36 arranged within the casing 2, as shown in FIG. 8. This frame 36 is formed by bending a thin metal sheet into a rectangle and interconnecting the bent end portions, and is used for attachment of a printed circuit board constituting the tape driving unit and the electronic circuit. The side of the frame 36 of the metal sheet facing the cell 60 has affixed thereto an insulating sheet for assuring positive electrical insulation between the frame 36 and the cell 60.

Figure 10:
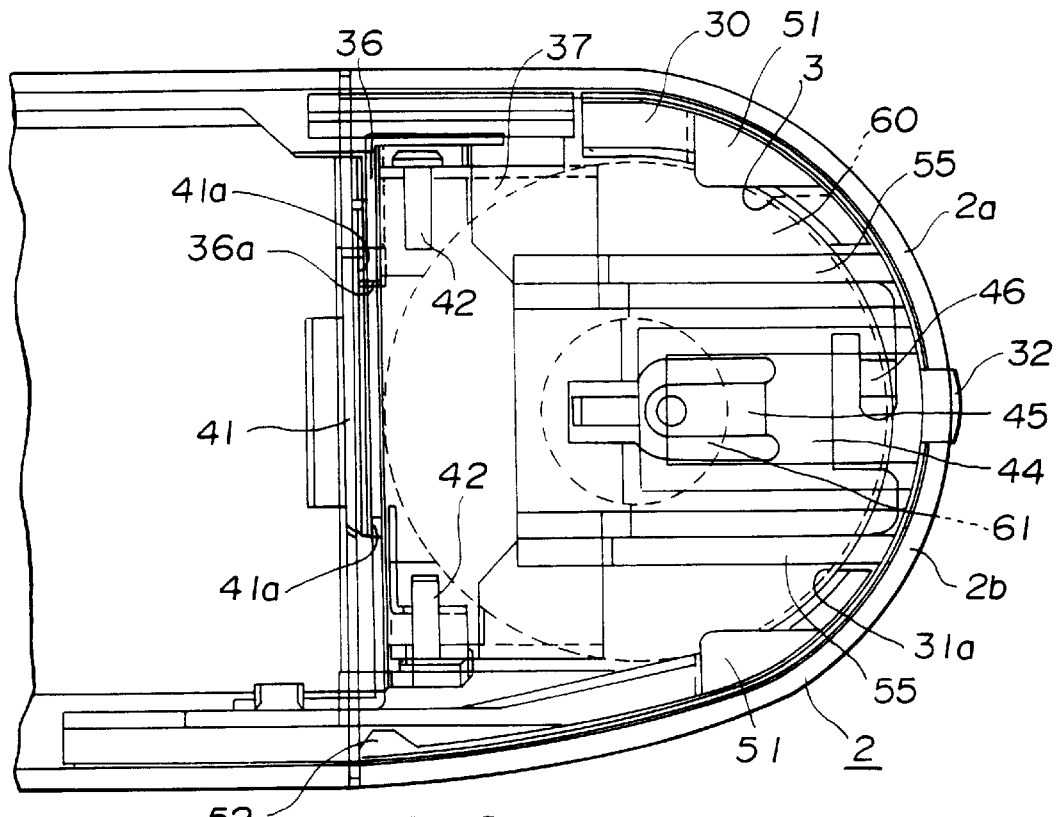
FIG. 10 is a front view of a cell container showing the state of closure of the opening in the cell container with an opening/closure member.
Figure 11:
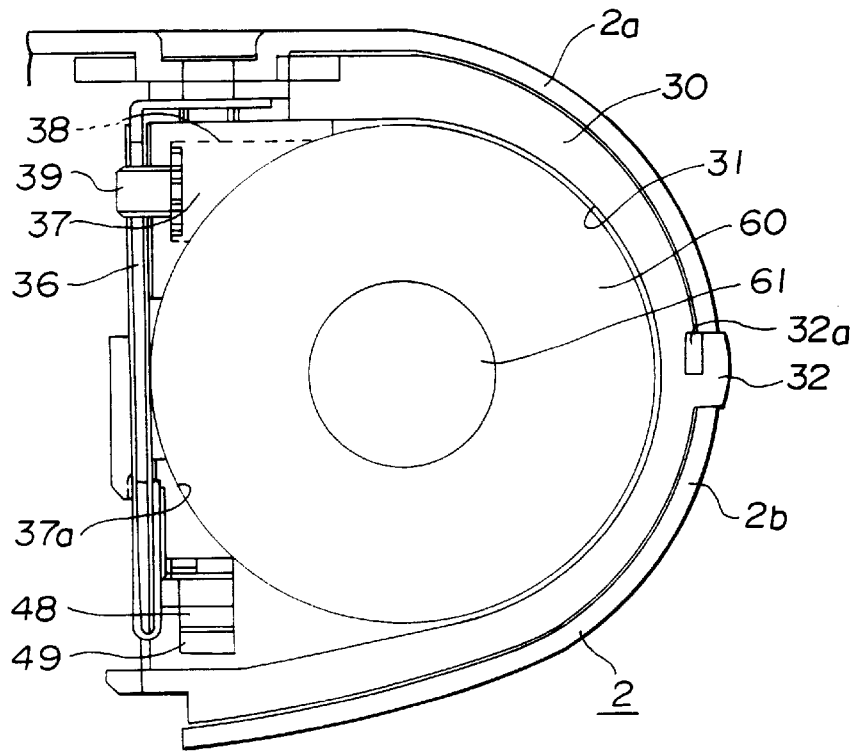
FIG. 11 is a cross-sectional view showing the inner structure of the cell container.

The upper and lower halves 2a, 2b making up the casing 2 are unified with the cell holder 30 by being engaged with engagement grooves 32a, 32b formed in a rib 32 formed longitudinally on the outer peripheral surface of the cell holder 30, as shown in FIGS. 8, 10 and 11.

Figure 9:
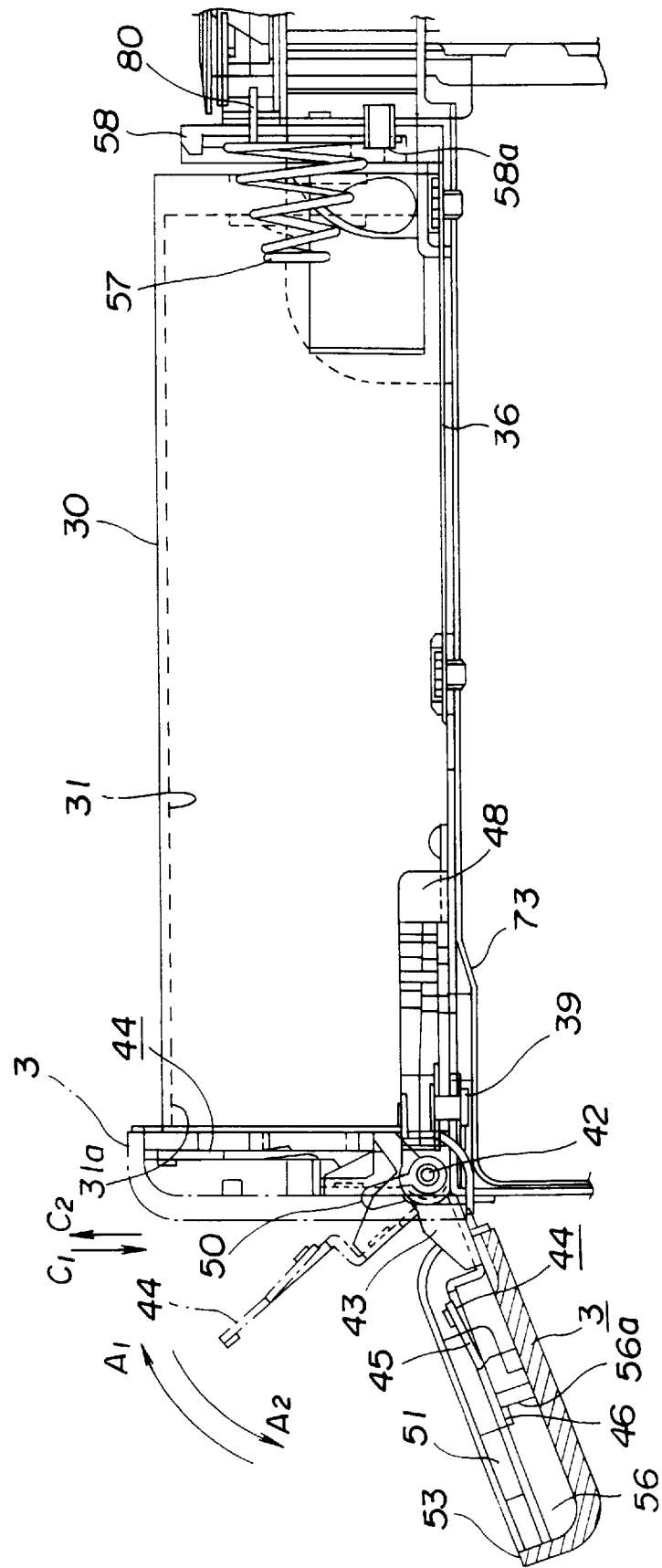
FIG. 9 is a side view of a cell container with the opening/closing member mounted on the cell container.

One end of the cell holder 31, that is the side facing a lateral surface of the casing 2, is formed with an opening 31a for insertion and detachment of the cell 60, as shown in FIGS. 8 and 9. This opening 31a is sized to be matched to the end face of the cell 60 accommodated in the cell container 31. Thus the cylindrically-shaped cell 60 is inserted into and detached from the cell container 31 with the longitudinal direction as the inserting and detachment direction.

On an inner end face of the cell container 31 is mounted a terminal member 57 formed by a coil spring formed in turn by winding an electrically conductive metallic wire, as shown in FIG. 9. The distal end of the coil spring electrically connected to a negative electrode of the cell 60 contained in the cell container is reduced in diameter. The terminal member 57 is mounted via a mounting plate 58 mounted on the inner end of the cell container 31. That is, the terminal member 57 formed by the coil spring has its large-diameter proximal end retained by a retainer 58a provided on the mounting plate 58 and has its terminal portion 80 protruded from the proximal end into the interior of the frame 31. This terminal portion 80 is electrically connected to a flexible printed circuit board 73 extended along the inner lateral surface of the frame 31 and is electrically connected via this flexible printed circuit board 73 to a printed circuit board constituting an electronic circuit mounted on the frame, as shown in FIG. 9.

The terminal member 57, formed by a coil spring, is adapted for pressuring the cell 60 housed within the cell container 31 against a terminal plate 44 as later enplaned.

On an opened side 31a of the cell container 31 is mounted an opening/closing member 3 adapted or opening/closing the opened end 31a. This opening/closing member 3 is mounted on the cell container 31 via a supporting member 37 arranged on the opened end 31a of the cell container 31 and a terminal plate 44 rotatably mounted on this supporting member 37.

The supporting member 37 is formed by molding an electrically insulating synthetic material, and is designed for supporting the outer peripheral surface of the cylindrically-shaped cell 60 contained in the cell container 31. That is, a rectangular-shaped space is defined between the substantially semispherically-shaped cell holder 30, the bottom surface of the cell holder 30 and a flat lateral surface of the frame 36. Thus, if the cylindrically-shaped cell 60 is contained in the cell holder 31, there is defined a substantially triangular-shaped space on the peripheral surface of the cell 60. Thus it becomes impossible to support the cell 60 contained in the cell container 31 reliably in position. The supporting member 37 is formed with a cell supporting surface 40 matching the outer peripheral surface of the cell 60. Thus, by supporting the outer peripheral surface of the cell 60 contained in the cell container 31 by a cell supporting surface 40, the cell 60 can be supported in position within the cell container 31.

On the back surface of the supporting member 37 facing a lateral surface of the frame 36 when the supporting member 37 is mounted within the cell container 31, there is formed an engagement protrusion 41 having an engagement groove 41a engaged with both lateral surfaces of a cut-out 36a formed in the frame 36, as shown in FIG. 10. This supporting member 37 is supported by the frame 36 by inserting the engagement protrusion 41 from the opened end of the cut-out 36a for engaging the engagement groove 41a with both sides of the cut-out 36a. The supporting member 37 is secured to the frame 36 as shown in FIG. 11 by a set screw 39 inserted via a tapped hole 38 formed in the supporting member 37 as shown in FIG. 8.

The supporting member 37 carries a pair of supporting shafts 42, 42 as shown in FIGS. 8 and 10. These supporting shafts 42, 42 are mounted on an end portion of the supporting member 37 towards the opening 31a when the supporting member 37 is arranged mounted in the cell container 31. These supporting shafts 42 are positioned coaxially within the substantially triangular spaces defined by a lateral surface of the frame 36 and the outer peripheral surface of the cell 60 housed within the cell container 31. That is, the supporting shafts 42 are arranged within the substantially triangular spaces delimited by an outer lateral surface of the cell 60 contained in the cell container 31 and the opening/closing member 3.

The terminal plate 44 is formed by bending an electrically conductive metallic sheet, such as phosphor bronze, and has supporting pieces 43 retained by the supporting shafts 42 so that the terminal plate will be supported by the holder 37, as shown in FIG. 8. The supporting pieces are formed by warping both lateral side portions of the proximal end of the terminal plate. That is, the terminal plate 44 may be turned in the directions indicated by arrows $A_1$, $A_2$ in FIGS. 8 and 9. The terminal plate 44 is formed as a tongue and has a center terminal portion 45 and an end engagement potion 46. The terminal portion 45 is electrically contacted with the anode of the cell 60 contained in the cell container 31.

The opening/closing member 3, rotatably supported via the terminal plate 44 for opening/closing the opening 31a of the cell container 31, is formed by molding an electrically insulating synthetic resin material, and is mounted for sliding with respect to the terminal plate 44. The inner lateral surface of the opening/closing member 3 is formed with a pair of engagement portions 55 adapted for being engaged with both inner lateral sides of the terminal plate 44, as shown in FIG. 8. An engagement recess 56 engaged by an engagement portion 46 of the terminal plate 44 is formed between these engagement portions 55. That is, the opening/closing member 3 is slid in the directions towards and away from the supporting shafts 42, with the engagement portions 55 being guided by the terminal plate 44 within the possible range of movement within the engagement recess 56, as indicated by arrows $C_1$, $C_2$ in FIG. 8.

The engagement recess 56 has a proximal lateral surface 56a for controlling the sliding position relative to the engagement piece 46 and for preventing inadvertent detachment of the opening/closure member 3 from the terminal plate 44.

When turned to the position of closing the opening 31a in cooperation with the opening/closing member 3, the terminal portion 45 is contacted with an anode 61 of the cell 60 contained in the cell container 31.

On a lateral side of the proximal end of the terminal plate 44 formed with the supporting portions 43, 43 is formed a lug 50. When the opening/closing member 3 is turned to a position of closing the opening 31a of the opening/closure member 3, the lug 50 is electrically contacted, in the substantially triangular portions defined between the lateral side of the frame 36 and the outer peripheral surface of the cell 60 contained in the cell container 31, with an electrically conductive flexible connecting piece 48 fitted on the supporting member 37. This connecting piece 48 is fitted in a fitting groove 47 formed in the supporting member 37. On the distal end of the connecting piece 48 is mounted a flexible terminal portion 49 formed by warping a portion of the connecting piece 48. That is, when the opening/closing member 3 is turned to a position of closing the opening 31a, the lug 50 formed on the terminal plate 44 is engaged and electrically contacted with another terminal portion 49 of the connecting piece 48 as the lug elastically flexes the terminal portion 49.

With the lug 50 thus being contacted with the terminal portion 49, the terminal plate 44 is electrically connected via the connecting piece 48 with an electronic circuit provided within the casing 2.

After the opening/closing member 3 is turned along with the terminal plate 44 for closing the opening 31a of the cell container 31, the opening/closing member 3 is moved in a direction approaching the supporting shafts 42 as indicated by arrow $C_1$ in FIG. 9, with the engagement portions 55 being guided along the terminal plate 44, for closing the opening 31a and the terminal plate 44 in their entirety.

Figure 12:
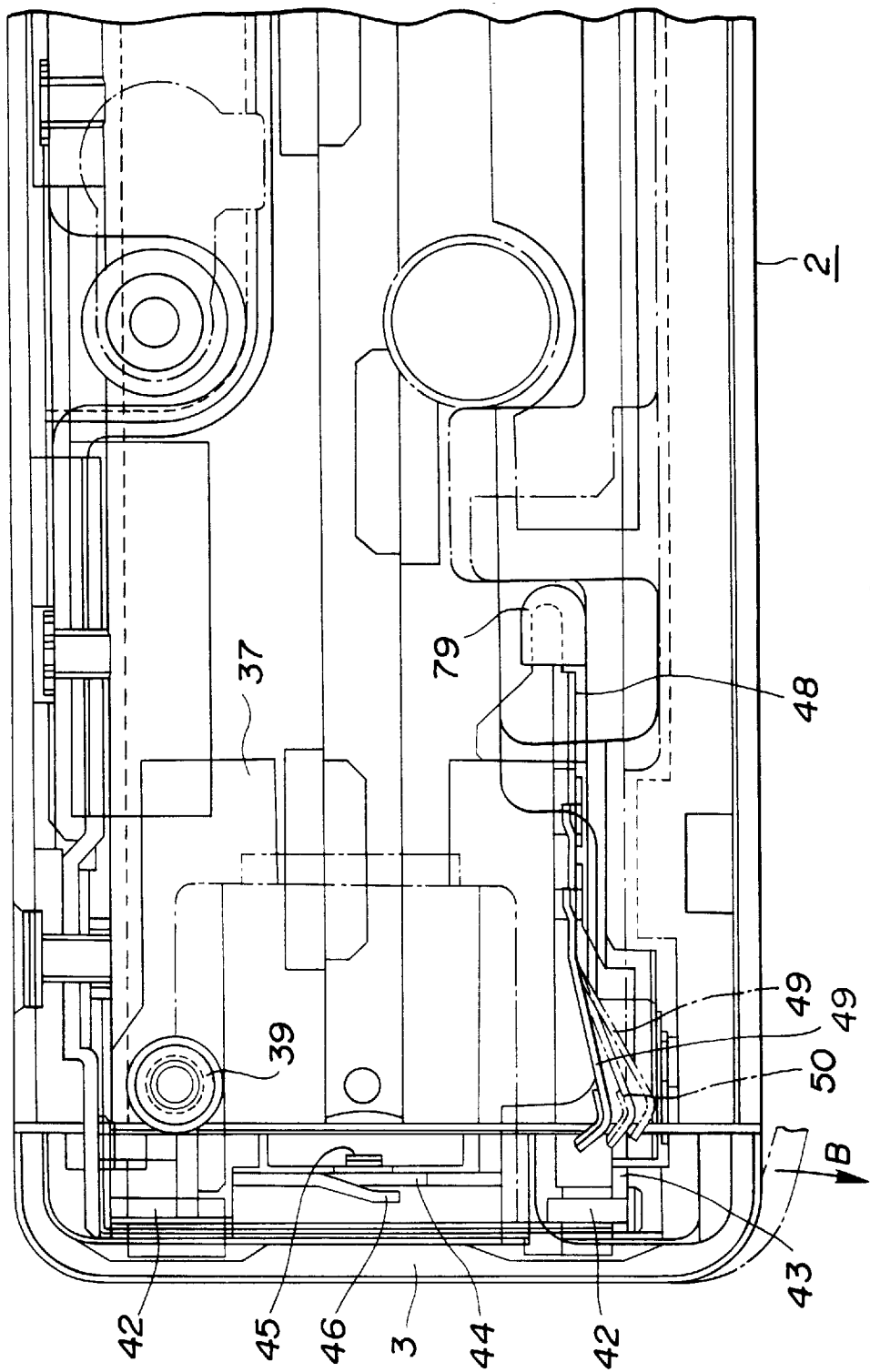
FIG. 12 is a plan view showing essential portions of the cell container and the opening/closure member.

On the outer peripheral surface of the opening/closure member 3 excluding its proximal portion supported by the supporting shafts 42 is formed an upstanding peripheral wall 53, as shown in FIG. 8. On one of the inner lateral surfaces of the proximal end of the peripheral wall 53 is formed an engagement portion 52. On one end of the cell holder 30 is formed a mating engagement portion 35 adapted for being engaged with the engagement portion 52 of the opening/closure member 3, as shown in FIG. 8. When the opening/closure member 3 is turned to a position of closing the opening 31a of the cell container 31 and thereby slid towards the supporting shafts 42, the engagement piece 52 is engaged with the mating engagement portion 35 as the engagement piece elastically flexes the mating engagement portion in a direction indicated by arrow B in FIG. 12. With the engagement portion 52 being engaged with the mating engagement portion 35, the opening/closure member 3 is locked at a position of closing the opening 31a.

On the inner lateral surface 53 of the opening/closure member 3 are protuberantly formed a pair of retention protrusions 51, as shown in FIG. 8. When the opening/closure member 3 has closed the opening 31a of the cell container 31 and is slid relative to the terminal plate 44, the retention protrusions 51 are engaged in an engagement groove 34 formed on one end face of the cell supporting member 30. With the engagement piece 52 and the engagement protrusions 51 thus being engaged in the mating engagement portion 35 and in the engagement groove 34, respectively, the opening/closure member 3 is reliably locked at the position of closing the opening 31a for controlling inadvertent opening for positively supporting the cell 60 housed within the cell container 31 while positively establishing electrical connection between the cell 60 and the cell circuit within the casing 2.

The proximal end of the opening/closure member 3 is formed with a protuberant engagement piece 54 engaged with a portion of the casing 2 when the opening/closure member 3 is turned to a position of closing the opening 31a and is further slid towards the supporting shafts 42. With the engagement piece 54 thus engaged with the casing 2, the opening/closure member 3 is limited with respect to the inadvertent rotation, while the cell 60 contained in the cell container 31 is supported reliably.

Figure 13:
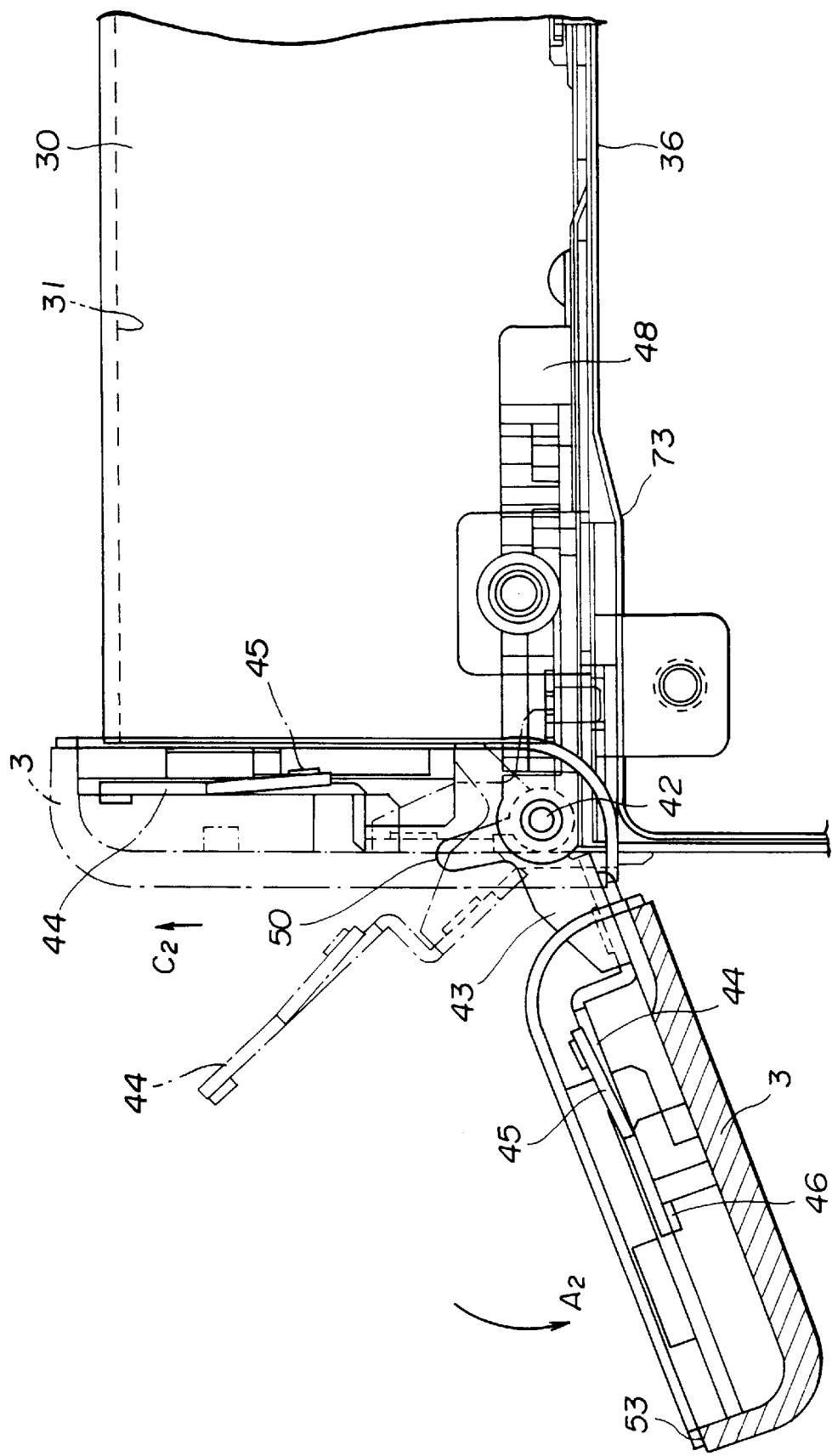
FIG. 13 is a cross-sectional side view showing the state of opening and closure of the opening formed in the cell container.

The opening/closure member 31 in the state of closing the opening 31a of the cell container 31 is slid with respect to the terminal plate 44 in a direction indicated by arrow $C_2$ in FIGS. 8, 9 and 13 for being disengaged from the casing 2 and turned in a direction A2 in FIGS. 8, 9 and 13 about the supporting shafts 42 as the center of rotation for opening the opening 31a.

Figure 19:
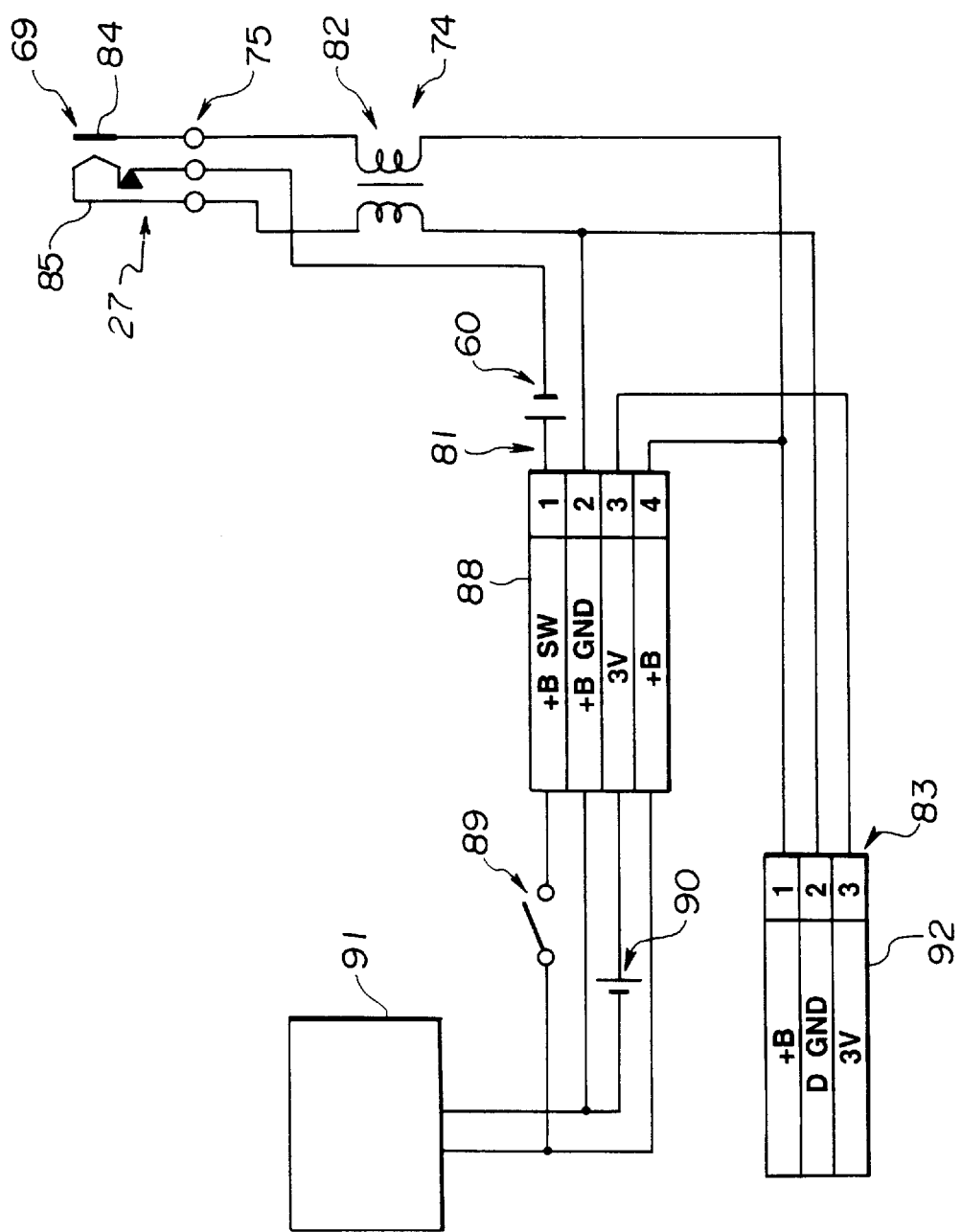
FIG. 19 is a circuit diagram showing the circuit construction of a power source unit of the electronic equipment of a tape recorder.

The tape recorder embodying the present invention is fed with the dc current from outside the apparatus via a connection terminal 69 provided on the plug jack 27 used for supplying the power from the power source, as shown in FIG. 19. A power source input terminal 84 of the connection terminal portion 69 is connected via a line filter 82 to a power source voltage portion (+B) of a substrate of a power source 88. The connection terminal portion 69 has its grounding terminal 85 connected via a line filter 82 to a grounding portion (+B·GND) of the substrate 88 via the line filter 82. The power source voltage portion (+B) and the grounding portion (+B≈GND) are connected to an electronic circuit 91 arranged within the casing 2 for supplying the power of the power source to the electronic circuit 91.

The grounding terminal 85 of the connection terminal portion 69 is connected to the cathode of the cell 60 housed within the cell container 31. The anode of the cell 60 is connected to the power source voltage portion (+B·SW) of the power source substrate 88. The power source voltage portion (+B·SW) is connected via a changeover switch 89 to the electronic circuit 91. That is, if the changeover switch 89 is the ON state, the power from the cell 60 is sent to the electronic circuit 91, whereas, if the changeover switch 89 is in the OFF state, the power supply from the cell 60 to the electronic circuit 91 is interrupted, while only the power supplied via the connecting terminal portion 69 is supplied to the electronic circuit 91.

A secondary cell 90 is connected across the power source voltage portion (B·GND) and the 3 V input portion of the power source substrate 88. This secondary cell 90 is used for holding a memory enclosed in a tape recorder or driving a timepiece.

Such electric circuit is constituted by a sole flexible printed circuit board 73, as shown in FIGS. 14 to 18. That is, the plug jack 27, provided with the connecting terminal portion 69, is mounted on the frame 36 by being held by a holding member 62. This holding member 62 is formed by bending a thin metallic plate in the shape of a letter U and has the distal end of a first bent piece 63a on an upper arm portion thereof in FIG. 14 secured to the frame 36 by a set screw 65. The holding member 62 is adapted for clamping the plug jack 27 between the first bent piece 63a and a second bent piece 63b facing the first bent piece 63a. The first bent piece 63a of the holding member 62 has a positioning groove 66 in which are fitted positioning pins 70, 71 protuberantly formed on the upper surface of the plug jack 27. A supporting piece 68 adapted for supporting the back surface of the plug jack 27 is segmented from an inner portion of the second bent piece 63b of the holding member 62. An insulating sheet is arranged between the supporting piece 68 and the plug jack 27.

On one end of the flexible printed circuit board 73 is formed a jack mounting portion 75 designed for mounting the plug jack 27 thereon. To a connecting portion formed on the jack mounting portion 75 is electrically connected a connecting terminal portion 69 of the plug jack 27 using a solder. The jack mounting portion 75 is formed with through-holes 72 into which are introduced the positioning pins 71 of the plug jack 27. On the flexible printed circuit board 73 is connected a line filter 82 in proximity to the plug jack 27. On one end of te flexible printed circuit board 73 is mounted a line filter mounting portion 74 in the vicinity of the jack mounting portion holding member 62 by having its portion lying between the plug jack 27 and the line filter 82 coiled around the first bent portion 63a. Thus the line filter 82 is arranged in a state of being set on the upper portion of the plug jack 27.

The flexible printed circuit board 73 is electrically connected to a power source substrate 88 and to an electronic circuit 91 via a connecting portion 83 formed by bending its mid portion and by a connecting portion 81 on its opposite side portion.

To a wiring pattern formed on the flexible printed circuit board 73 are connected a terminal plate 44 as a first terminal portion and a terminal member 57 as a second terminal portion. The first and second terminal portions are adapted for being contacted with the respective electrodes of the cell 60 contained in the cell container 31. Specifically, on a mid portion of the flexible printed circuit board 73, there is mounted a connecting piece 76 having a connecting portion 77 to which is soldered a connecting piece 48 electrically connected to the terminal plate 44 operating as the first terminal portion on the anode side. Another connecting piece 48 is connected to the connecting piece 76. The flexible printed circuit board 73 is provided with a connecting portion 78 to which is soldered the proximal end of the terminal member 57 operating as a second terminal portion on the cathode side.

Figure 14:
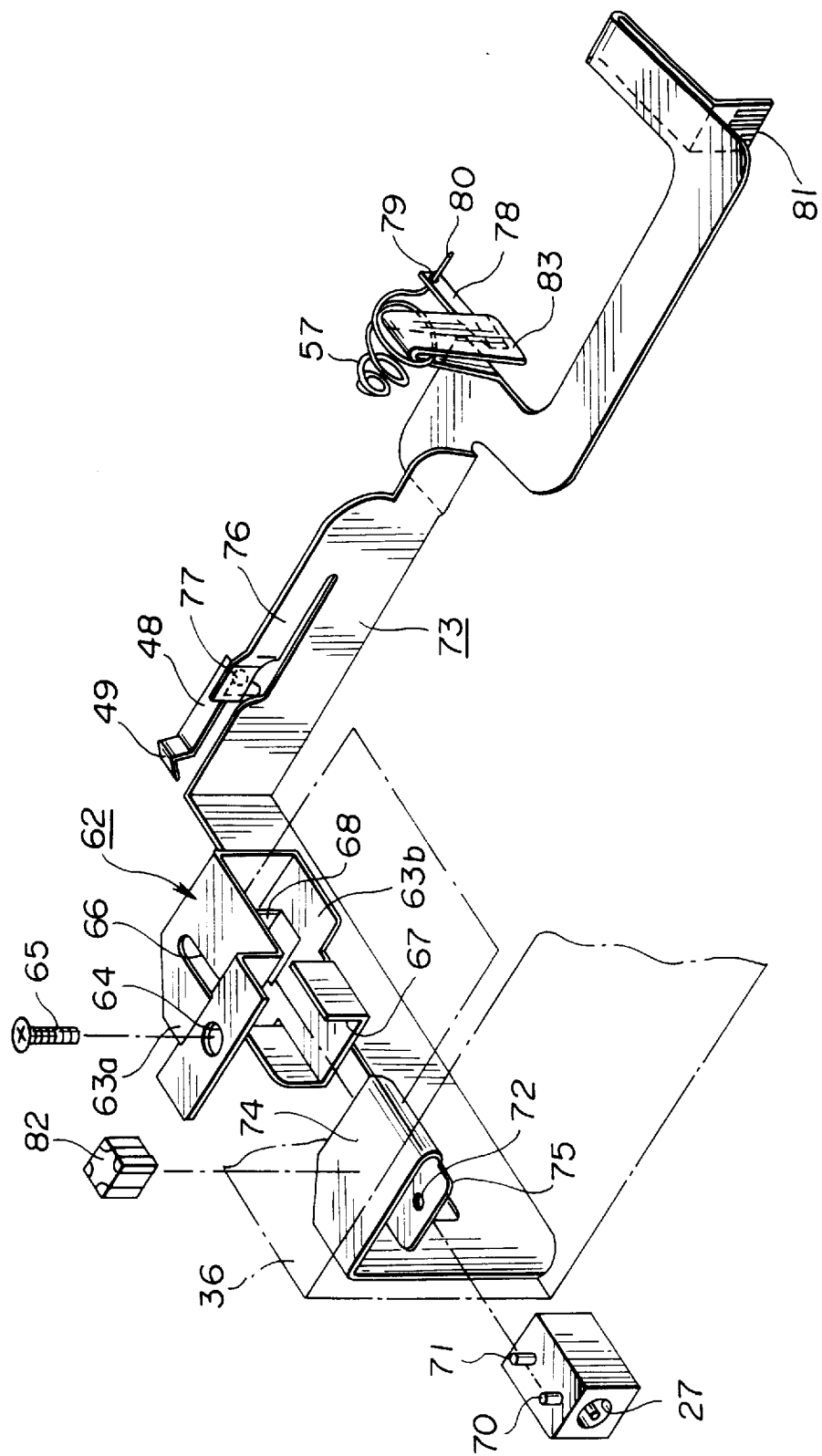
FIG. 14 is a perspective view showing a flexible printed circuit board mounted within the tape recorder.

Meanwhile, the connecting portion 78 is formed on the distal end of a bent piece 83 formed by segmenting a mid portion of the flexible printed circuit board 73, as shown in FIG. 14. The terminal member 57 is connected to this connecting portion 78 by inserting a terminal portion 80 protuberantly formed on the proximal end of the terminal member 57. The bent piece 83 has a mid bent portion for retention of the proximal end of the terminal member 57.

Figure 15:
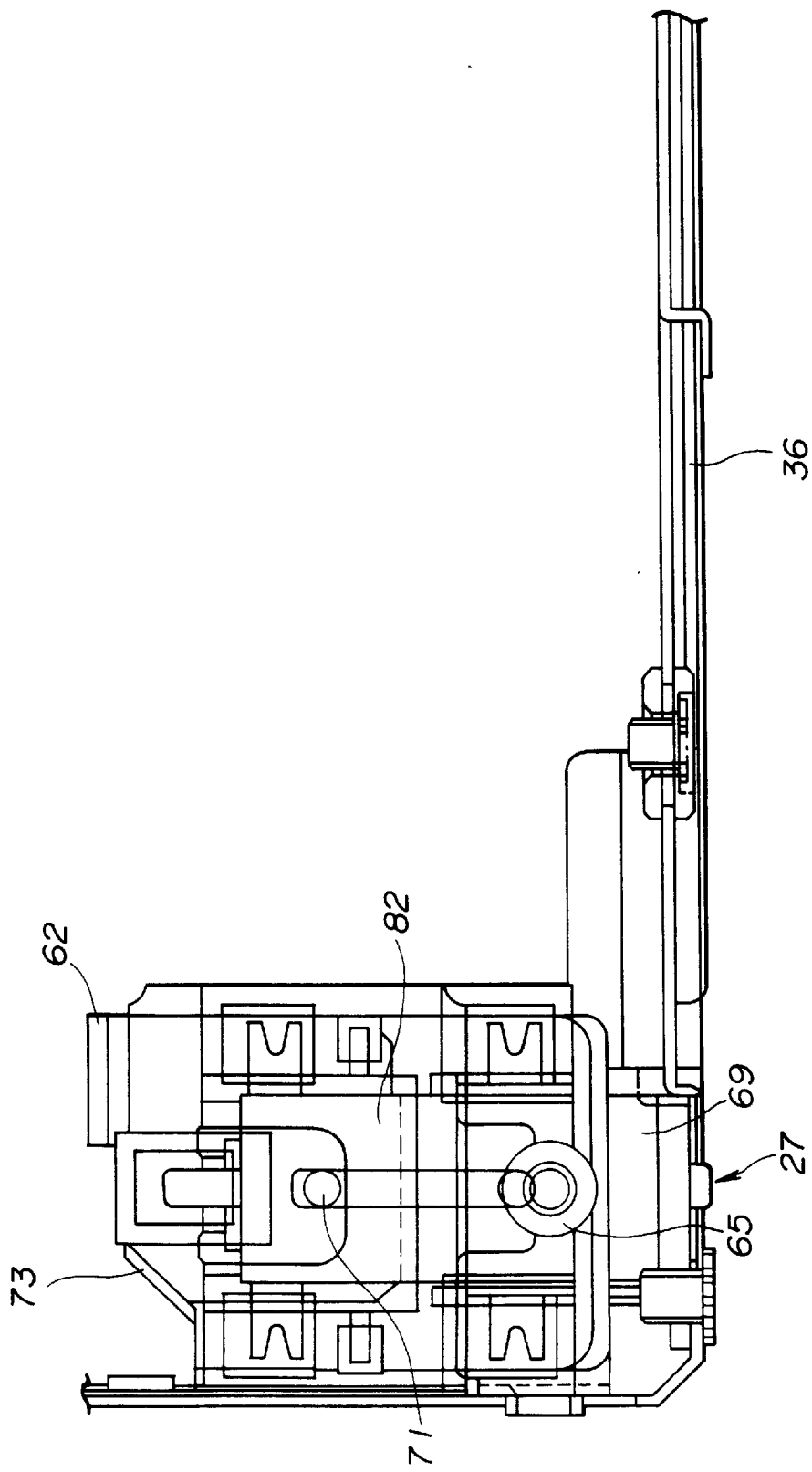
FIG. 15 is a plan view showing the mounting state of a plug jack for supplying the power source.
Figure 16:
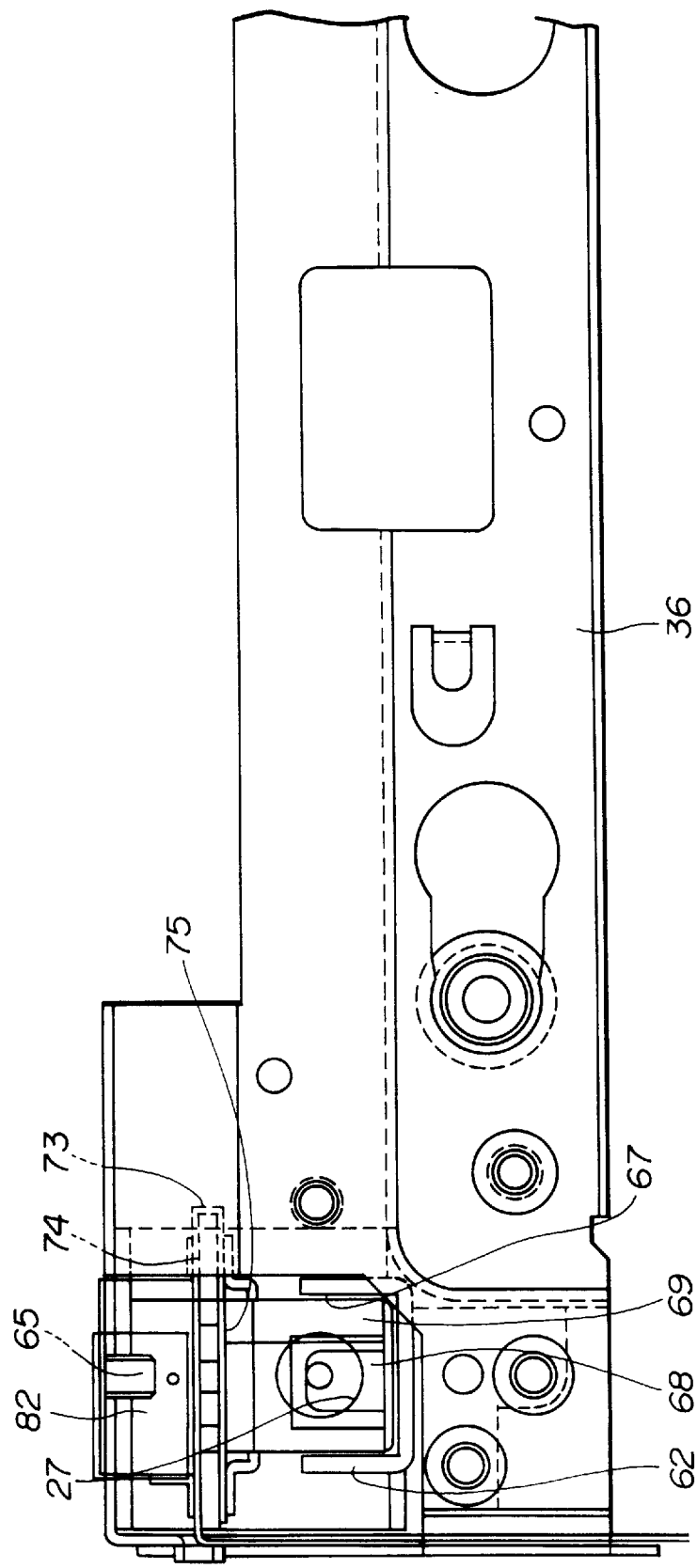
FIG. 16 is a back-side view showing the mounting state of the plug jack.

The flexible printed circuit board 73 is arranged for extending along the frame 36, as shown in FIGS. 14 and 15, so as to be reliably connected to the electronic circuit 91 without imposing mechanical load on the connecting piece 48 nor on the terminal member 57.

Figure 17:
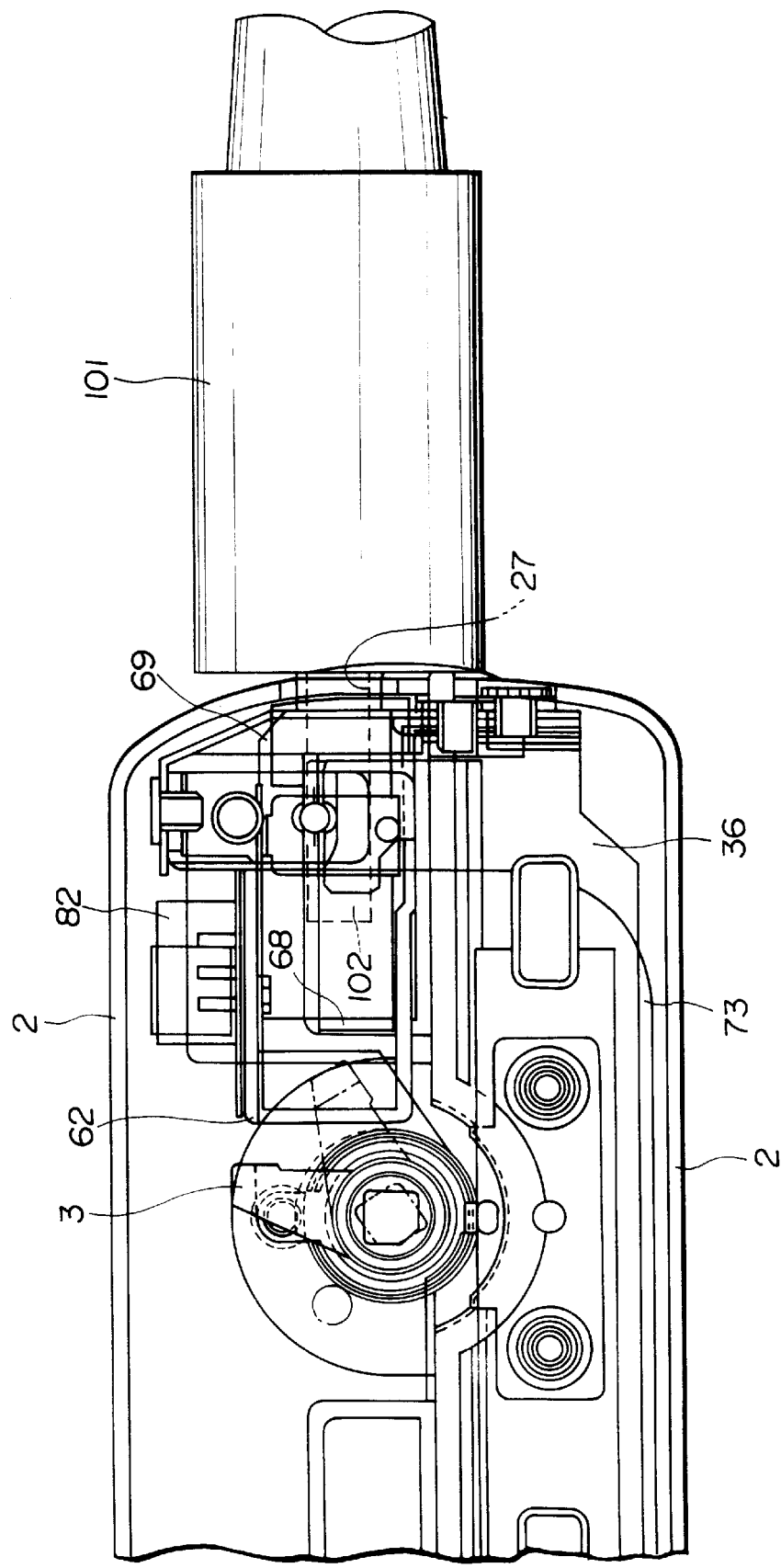
FIG. 17 is a side view showing a flexible printed circuit board mounted on the tape recorder.
Figure 18:
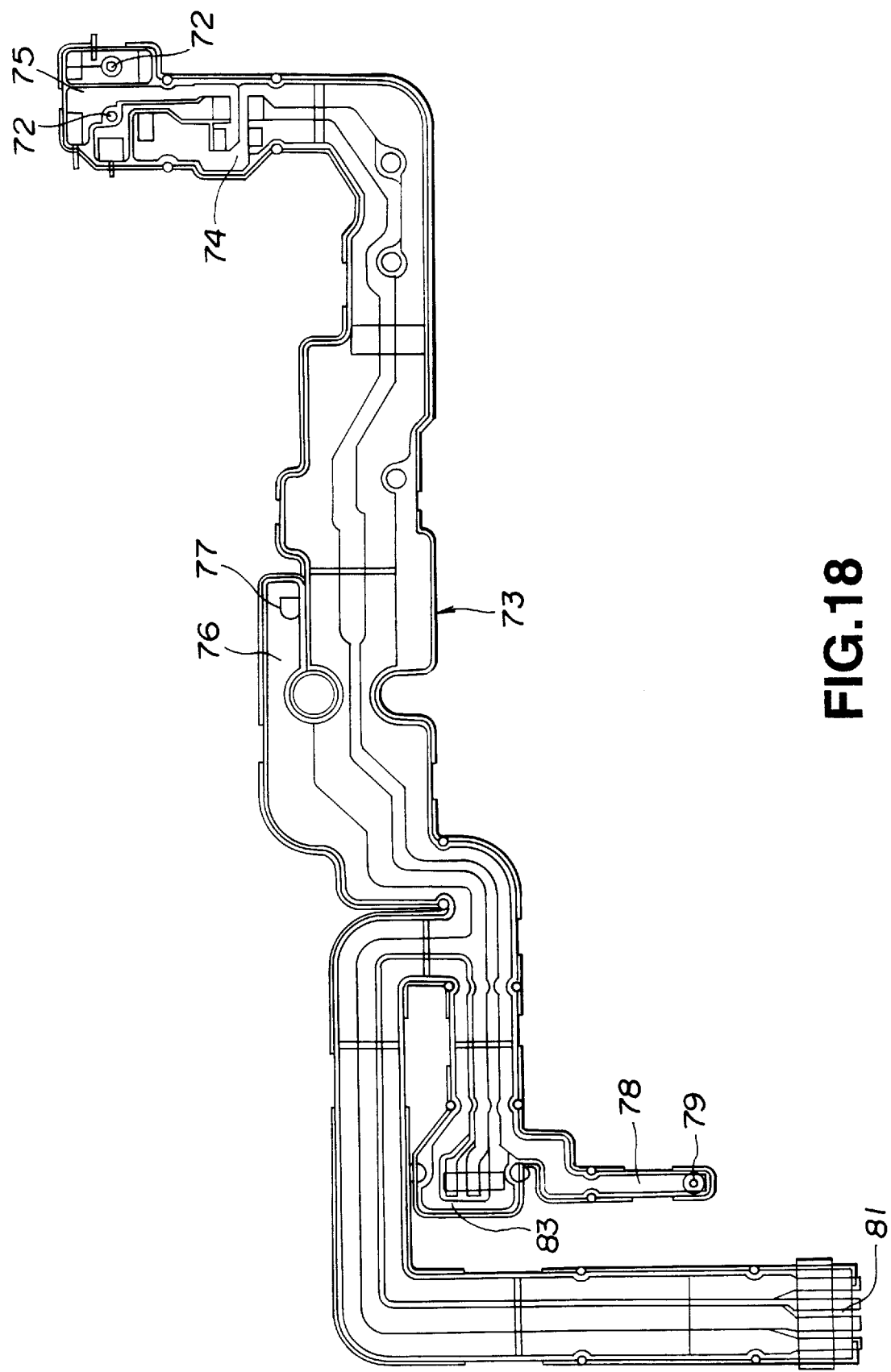
FIG. 18 is a top view showing the flexible printed circuit board.

In the plug jack 27 provided on the casing 2 for power supply is fitted a plug member 102 of a connection plug 101 provided on the distal end of a connection cord connected to an external equipment provided with an ac/dc converter or a power source unit, as shown in FIG. 17.

Although the above-described embodiments are directed to a tape recorder, the present invention may also be directly applied to an electronic equipment, such as a radio receiver, or a disc player having a cell container having the cell enclosed therein. That is, the above-mentioned merits can be realized by application to any cell containers provided on the electronic equipments.

INDUSTRIAL APPLICABILITY

With the electronic equipment according to the present invention, the terminal plate contacted with a terminal of a cell housed within the cell container is provided on an opening/closure member adapted for opening or closing the cell container, while a mechanism for holding the opening/closure member at the closure position is provided on the main body member of the equipment. In addition, a connecting portion engaged with a terminal plate when the opening/closure member is at the position of closing the opening is provided on the cell container. Thus, if the opening/closure member is closed with the cell contained in the cell container, positive electrical connection with the electronic circuit in the main body portion of the equipment may be realized, while the opening/closure member may be held at the position of closing the opening.

Thus, with the electronic equipment of the present invention, reliable electrical connection may be established between the cell contained in the cell container and the electronic circuit in the main body portion by closure of the opening by the opening/closure member, while the cell may be reliably held within the cell container.

Since the opening/closure member is mounted for rotation with a center of rotation disposed in a space portion defined by the opening/closure member closing the opening in the vicinity of the opening of the cell container and the cell contained in the cell container, it becomes possible to reduce the size of the mounting space and that of the main body portion of the electronic equipment.

I claim:

1. An electronic equipment comprising:

a cell container having an opening for containing a cylindrically-shaped cell inserted via said opening;

a cover for opening/closing said opening of said cell container having a slot on an inside main surface and a sidewall;

a conductive terminal plate having a first end rotatable supported by said cell container and including a mounting portion for slidably supporting said cover by engaging said slot of said cover and a first terminal portion for electrically contacting a terminal of said cell when said opening is closed by said cover, said cover being moved to a closed position by sliding said cover in a direction toward said first end of said terminal plate;

holding means for holding said cover in said closed position including:

a first protrusion formed on a side of an inner surface of said sidewall of said cover, a second protrusion formed on a side of said cell container for engaging with said first protrusion when said cover is slid toward said closed position, said sidewall of said cover being adapted to outwardly deflect when said first protrusion rides over said second protrusion while said cover is slid toward said closed position and said first protrusion engaging with said second protrusion when said cover is in said closed position; and a connecting portion provided on said cell container for engaging and electrically connecting with said terminal plate when said cover is slid to said closed position.

2. The electronic equipment as claimed in claim 1, wherein said terminal plate further includes a second terminal portion on said first end for engaging and electrically connecting with said connecting portion.

3. The electronic equipment as claimed in claim 2, wherein said connecting portion comprises an elastically deformed member, and wherein when said cover is moved toward said closed position, said connecting portion is elastically deformed by said second terminal portion of said terminal plate for forming an electrical connection therebetween.

4. An electronic equipment comprising:

a main body portion;

a cell container for housing a cylindrically-shaped cell inserted through an opening of said main body portion and formed of a section having a substantially semi-cylindrical shape adjacent a flat wall, said cell being inserted into the cell container in an axial direction thereof and being held in said cell container by contacting said flat wall and a portion of said semicylindrical shaped section, said cell container having a pair of raised portions filling a space between said flat wall and said cell inserted in said cell container, wherein said cell container includes a first terminal portion connected to a first of two terminals of said cylindrically-shaped cell;

a cover for opening/closing said opening;

a second terminal portion for slidably supporting said cover and adapted for being connected to a second terminal of said cylindrically-shaped cell contained in said cell container as said opening is closed by said cover, said second terminal portion being rotatably supported on one end to said cell container by a pair of supporting shafts coaxially positioned with each other and located in said pair of raised portions; and connection means provided in said cell container and disengaged from said second terminal portion when said cover is in an open position and electrically connected with said second terminal portion when said cover is in a closed position.

5. The electronic equipment as claimed in claim 4, wherein said second terminal portion further includes a lug and a mounting portion for slidably supporting said cover, wherein said lug is electrically connected to said connection means when said cover is in said closed position.

6. The electronic equipment as claimed in claim 5, wherein said connection means includes a flexible terminal portion which is flexibly engaged and electrically connected with said lug when said cover is slid to said closed position.

7. The electronic equipment as claimed in claim 5, wherein said lug and said mounting portion of said second terminal portion are formed by electrically conductive plate-shaped members.

8. The electronic equipment as claimed in claim 5, wherein said cover slides relative to said second terminal portion and further includes holding means for holding said cover in said closed position, thereby maintaining said cover in said closed position.

9. The electronic equipment as claimed in claim 8, wherein said holding means has an engagement portion on one of said cell container and said cover and a mating engagement portion on the other one of said cell container and said cover, and wherein when said cover is slid relative to said second terminal portion in a direction toward said pair of supporting shafts said engagement portion is engaged with said mating engagement portion, whereby said engagement portion and said mating engagement portion are engaged with each other for maintaining said cover at said closed position.

* * * * *